United States Patent [19]

Hong et al.

[11] Patent Number: 5,126,862
[45] Date of Patent: Jun. 30, 1992

[54] IMAGE TRANSMISSION THROUGH THICK ABERRATORS

[75] Inventors: John H. Hong, Moorpark; Tallis Y. Chang, Woodland Hills, both of Calif.

[73] Assignee: Rockwell International Corporation, Seal Beach, Calif.

[21] Appl. No.: 655,525

[22] Filed: Feb. 13, 1991

[51] Int. Cl.[5] .......................... G03H 1/12; G03H 1/26
[52] U.S. Cl. .......................................... 359/7; 359/24; 359/28; 359/30
[58] Field of Search .................... 350/3.62, 3.64, 3.75, 350/3.77, 3.81, 3.83; 359/7, 24, 28, 30

[56] References Cited

U.S. PATENT DOCUMENTS

| | | | |
|---|---|---|---|
| 3,606,519 | 9/1971 | Kurtz | 350/3.77 |
| 3,615,123 | 10/1971 | Wuerker | 350/3.77 |
| 3,639,033 | 2/1972 | Haines . | |
| 3,677,617 | 7/1972 | Upatnieks | 350/3.83 |
| 3,704,930 | 12/1972 | McMahon . | |
| 3,774,986 | 11/1973 | Boorgoin et al. | 350/3.77 |
| 3,782,802 | 1/1974 | Micheron et al. | 350/3.77 |
| 4,364,627 | 12/1982 | Haines | 350/3.83 |

OTHER PUBLICATIONS

Papi et al., "Imaging by Microwave Holography Through Aberrating Media," *IEEE Transactions on Antennas and Propagation*, vol. AP-24, No. 6, Nov. 1976, pp. 832 to 836.

*Primary Examiner*—Bruce Y. Arnold
*Assistant Examiner*—Martin Lerner
*Attorney, Agent, or Firm*—John C. McFarren

[57] ABSTRACT

A method is provided for reconstructing an image transmitted through a thick distorting medium. A remote source provides coherent light at the object plane, and a local source, typically derived from the remote source, provides corresponding light that is coherent with respect to the remote source. Light from the remote source is directed through the thick aberrator and into a holographic medium, such as a photorefractive crystal, to interact with corresponding light from the local source and produce a volume hologram. An angularly multiplexed volume hologram, which covers the entire object field, is written into the holographic medium by successive exposures of light from the remote and local sources for successive pixels of the object plane. Light from an object, which comprises two-dimensional information from the object plane, can be reconstructed by the volume hologram after being distorted by the thick aberrator. Light from each point of the object accesses the set of gratings in the volume hologram and reconstructs only the reference wave associated with it. Reconstructed waves emerging from the hologram are then focused by a following lens to form a high resolution image of the object at the image plane of the lens.

9 Claims, 1 Drawing Sheet

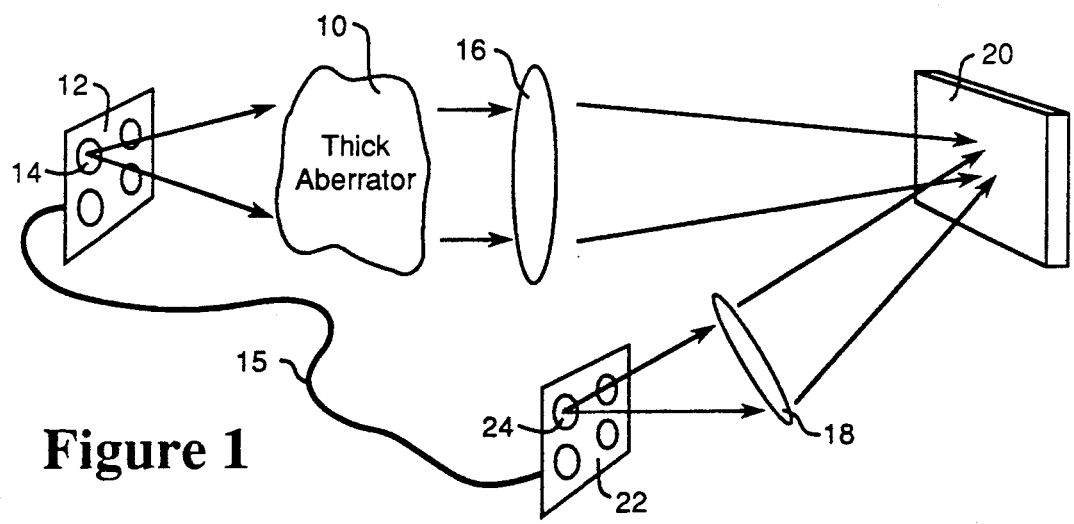
Figure 1
Figure 1A
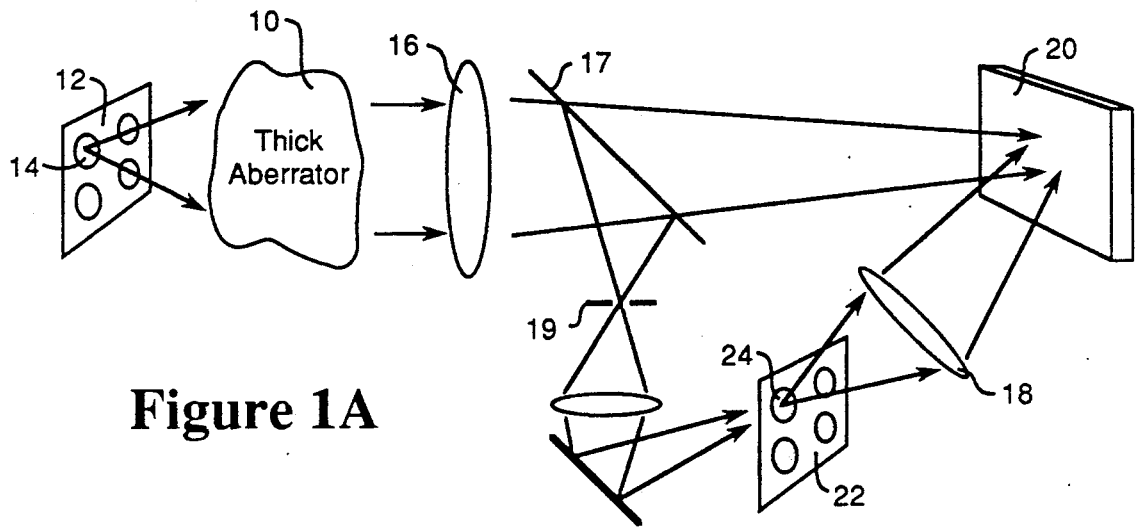
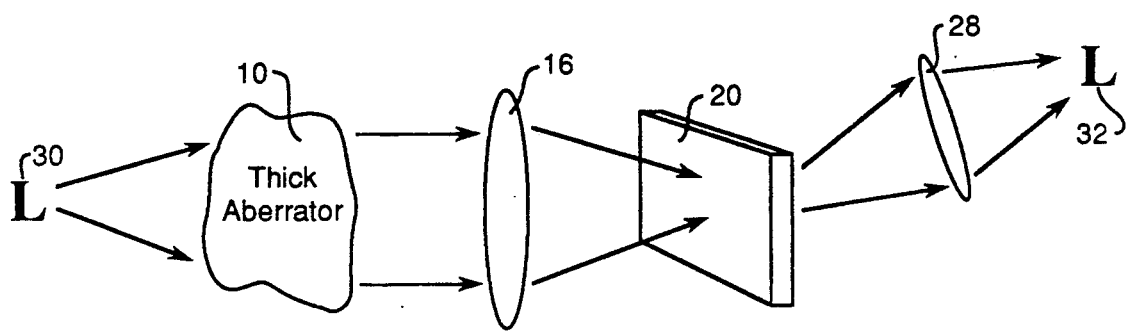
Figure 2

IMAGE TRANSMISSION THROUGH THICK ABERRATORS

TECHNICAL FIELD

The present invention relates to the field of optical image transmission systems and, in particular, to a method of transmitting two-dimensional images through thick aberrating media.

BACKGROUND OF THE INVENTION

A long-sought goal in the field of optics has been the ability to receive high-resolution images (i.e., two-dimensional information) that have been transmitted through a distorting medium, such as the atmosphere or a multimode optical fiber. Nonlinear optical techniques have been developed for the correction of images transmitted through "thin" aberrators whose optical transformation properties can be represented by a complex multiplicative phase factor, $\exp[i\phi(x,y)]$, where $\phi(x,y)$ characterizes the optical distortion produced by the thin aberrator. The optical transformation property of an arbitrary distorting medium (i.e., a "thick" aberrator), however, cannot be adequately described simply by a multiplicative phase factor. In an arbitrary distorting medium characterized by a four-dimensional kernel $h(x,y; x_0,y_0)$, where $(x_0,y_0)$ are the object coordinates and $(x,y)$ are the image coordinates, an input object $f(x_0,y_0)$ results in an output distribution $g(x,y)$ given by:

$$g(x,y) = \int\int f(x_0,y_0)\, h(x,y; x_0,y_0)\, dx_0\, dy_0.$$

The approaches and approximations used for representing the optical transformation properties of thin phase distorters (i.e., where the effective optical thickness of the aberrator is less than approximately the wavelength of the light) have been shown to be inadequate for characterizing thick aberrators. Therefore, new methods of determining optical transformation properties of arbitrary distorting media are needed for reconstructing high-resolution images of two-dimensional information transmitted through thick aberrators.

SUMMARY OF THE INVENTION

The present invention comprises a method of reconstructing a two-dimensional image transmitted through a thick aberrating medium, such as a multimode fiber. A remote source of coherent light, such as a laser, provides illumination at an object plane. In addition, a local source provides light that is coherent with respect to the light from the remote source. Typically, the local source is derived from the remote source by well known optical techniques. Light from the remote source is directed through the thick aberrator and then into a holographic medium,, such as a photorefractive crystal. Corresponding light from the local source is also directed into the holographic medium to mix with the light from the remote source and form a volume hologram. A series of such volume holograms are written into the holographic medium by successive exposures of corresponding light from the remote and local sources. For each successive exposure, the remote source illuminates (or emanates from) a successive portion (or pixel) of the object field, the light from which is mixed in the holographic medium with the corresponding light from the local source. Volume holograms are thus written into the holographic medium to cover the entire object field to an acceptable degree of resolution. The result is an angularly multiplexed volume hologram in which each component hologram records $h(x,y; x_i,y_i)$, where $(x_i,y_i)$ describes the location of the remote source.

Light from an object, which comprises two-dimensional information passing through the thick aberrator, can be reconstructed using the angularly multiplexed volume hologram that has been written in the holographic medium. The two-dimensional information characterizing the object comprises N x M pixels, for example, from the object plane. After distortion by the aberrator, light from each point of the object at the object plane accesses the set of gratings in the volume hologram and reconstructs only the reference wave associated with it. The reconstructed waves emerging from the hologram are then focused by a lens. The hologram and following lens function to reconstruct a high resolution image of the object at the image plane of the lens.

BRIEF DESCRIPTION OF THE DRAWINGS

For a more complete understanding of the present invention and for further advantages thereof, the following Detailed Description of the Invention makes reference to the accompanying Drawings, in which:

FIG. 1 is a schematic illustration of a method of writing an angularly multiplexed volume hologram characterizing the optical transformation properties of a thick aberrator;

FIG. 1A is a schematic illustration of an alternate method of writing an angularly multiplexed hologram characterizing the optical transformation properties of the thick aberrator; and FIG. 2 is a schematic illustration of a method of using the angularly multiplexed volume hologram to reconstruct an image of an object distorted during transmission by the thick aberrator.

DETAILED DESCRIPTION OF THE INVENTION

A method of reconstructing an image distorted by a thick aberrator 10 is shown schematically in FIGS. 1 and 2. A thick aberrating medium is generally defined as a light transmissive medium that introduces wavefront distortion that cannot be adequately characterized simply by a multiplicative phase factor. Thick aberrator 10 may comprise the atmosphere or a multimode optical fiber, for example. In FIG. 1, an object plane is illustrated as a field 12 comprising a plurality of segments, or pixels, such as pixel 14. If light comprising a two-dimensional image of an object positioned in field 12 is directed through thick aberrator 10, the image of the object becomes distorted and unrecognizable.

In the method of the present invention, two-dimensional optical information distorted during transmission by thick aberrator 10 is reconstructed by a volume hologram formed in holographic medium 20, which may comprise a photorefractive crystal, for example. To form the hologram, a remote reference source of coherent light, such as a laser, si positioned to provide illumination from a segment of object field 12, such as from pixel 14. The coherent light from pixel 14 is directed through thick aberrator 10 and focused by a lens 16 into holographic medium 20. At the same time, a local reference source of light, which is coherent with respect to the remote source, is directed by lens 18 into holographic medium 20 from a pixel 24 in a local field 22 that corresponds to pixel 14 in field 12. Light from the remote and local sources interacts within holographic medium 20 to form a volume hologram. Typically, the local source of light is derived from the remote source using one of several well known methods. For example, coherent light from pixel 14 may be routed to pixel 24 through a single mode optical fiber, as illustrated in FIG. 1. Alternatively, a beam splitter may be used to reflect a portion of the light focused by lens 16 as illustrated in FIG. 1A. The portion of light reflected by the beam splitter can be passed through a pinhole filter 19, refocused to form the local source, and redirected by a mirror into holographic medium 20.

The volume hologram formed for pixel 14 is useful, however, only for reconstructing light from pixel 14. To reconstruct an image of an object comprising N x M pixels, for example, a hologram corresponding to each of the pixels must be formed. Therefore, a plurality of volume holograms are formed in holographic medium 20 by a series of successive exposures of light from the remote and local sources. Each successive exposure is made from light directed from a successive pixel in remote field 12 and a corresponding pixel in local field 22. This procedure is repeated until the entire object field 12 is covered to the desired degree of resolution. The result of successive exposures is the creation of an angularly multiplexed volume holograms in which each component hologram records $h(x,y; x_i,y_i)$, where $(x_i,y_i)$ describes the location of the remote source. The transformation kernal $h(x,y; x_i,y_i)$ is known as the impulse response function from a point source located at $(x_i,y_i)$.

An alternative to forming the multiplexed volume hologram by successive exposures of individual pixels may be the use of corresponding arrays of laser diodes at the remote field 12 and the local field 22. Each diode in the corresponding arrays would represent one pixel of the field and would be phase locked to the other diodes but at a separate frequency. At least one diode in the remote array would be locked to the corresponding diode in the local array to maintain overall correspondence between the two arrays. With this arrangement, the angularly multiplexed volume hologram could be formed in holographic medium 20 by simultaneous exposure to all the diodes in the two arrays.

The angularly multiplexed volume hologram in holographic medium 20 represents the optical transformation properties of thick aberrator 10 with respect to the object field 12. Thus, an image of an object at the plane of remote field 12 can be reconstructed by interaction of the light with the set of gratings comprising the multiplexed volume hologram. As illustrated in FIG. 2, light from an object 30 at the object plane is directed through thick aberrator 10 and focused by lens 16 into holographic medium 20, which contains the previously written multiplexed volume hologram. Focusing of light from object 30 into holographic medium 20 using lens 16 should be done identically to that of focusing the coherent reference light from field 12 during the hologram writing steps described above. Because of the characteristics of the hologram, each point (pixel) of object 30 will reconstruct only the reference wave associated with it. The reconstructed waves emerge from holographic medium 20 and are focused by following lens 28 to form an image 32 at the image plane of lens 28. Image 32 is the reconstructed image of object 30 that was distorted by transmission through thick aberrator 10. The resolution of image 32 depends on the optical properties of the various components of the system and the number and density of pixels at fields 12 and 22 used to create the angularly multiplexed volume hologram in holographic medium 20. This method of reconstructing distorted images is useful, for example, in transmitting images through multimode fibers where the distortion mechanisms, such as intermodal coupling, are fixed.

Although the present invention has been described with respect to a specific embodiment thereof, various changes and modifications may be suggested to one skilled in the art. Therefore, it is intended that the present invention encompass such changes and modifications as fall within the scope of the appended claims.

We claim:

1. A method of transmitting an optical image through an arbitrary distorting medium, comprising the steps of:
   providing remote reference light comprising a plurality of pixels of coherent light at a remote object plane;
   providing local reference light comprising a corresponding plurality of pixels of light coherent with respect to said remote reference light;
   directing light from said pixels of said remote reference light through the distorting medium and into a holographic medium;
   directing light from said corresponding pixels of said local reference light into said holographic medium to interact on a pixel by pixel basis with said light from said pixels of said remote reference light and form an angularly multiplexed volume hologram in said holographic medium;
   directing light from an object at said remote object plane through the distorting medium and through said angularly multiplexed volume hologram; and
   projecting light emerging from said angularly multiplexed volume hologram to form an image of said object at an image plane.

2. The method of claim 1, further comprising the step of deriving said local reference light from said remote reference light.

3. The method of claim 1, wherein the steps of providing said remote and local reference light further comprise the steps of:
   forming said plurality of remote reference light pixels with an array of remote laser diodes;
   forming said corresponding plurality of local reference light pixels with a corresponding array of local laser diodes; and
   phase locking light from said local laser diodes with light from said remote laser diodes.

4. A method of transmitting an optical image through a thick aberrating medium, comprising the steps of:
   providing remote reference light at a remote object plane, said remote reference light comprising a plurality of pixels of coherent light;
   directing light from said pixels of said remote reference light through the thick aberrating medium and into a holographic medium;
   providing local reference light derived from said remote reference light, said local reference light comprising a corresponding plurality of pixels of light coherent with respect to said remote reference light;
   directing light from said corresponding pixels of said local reference light into said holographic medium to interact on a pixel by pixel basis with said light from said pixels of said remote reference light and form an angularly multiplexed volume hologram in said holographic medium;

directing light from an object located at said remote object plane through the thick aberrating medium and through said angularly multiplexed volume hologram; and projecting light emerging from said angularly multiplexed volume hologram to form an image of said object.

5. The method of claim 4, wherein the steps of providing said remote and local reference light further comprise the steps of:

forming said plurality of remote reference light pixels with an array of remote laser diodes;

forming said corresponding plurality of local reference light pixels with a corresponding array of local laser diodes; and phase locking light from said local laser diodes with light from said remote laser diodes.

6. The method of claim 4, wherein the step of providing said local reference light further comprises the steps of:

redirecting a portion of said remote reference light emerging from the aberrating medium; and filtering said redirected remote reference light through a pinhole filter to provide said local reference light coherent with said remote reference light.

7. A method of transmitting an optical image of a remote object through a thick aberrating medium, comprising the steps of:

providing a remote reference source of coherent light at a remote object plane, said remote reference source comprising a plurality of pixels;

providing a local reference source of light comprising a corresponding plurality of pixels in a local plane, said local reference light coherent and in phase with respect to said remote reference light;

providing a holographic medium;

directing said remote reference light from said plurality of pixels in said remote object plane through the thick aberrating medium and into said holographic medium;

directing said local reference light from said corresponding plurality of pixels in said local plane into said holographic medium to interact with said remote reference light on a pixel by pixel basis;

exposing said holographic medium to said remote and local reference light on said pixel by pixel basis to form an angularly multiplexed volume hologram in said holographic medium;

directing light from an object at said remote object plane through the thick aberrating medium and through said angularly multiplexed volume hologram; and projecting light emerging from said angularly multiplexed volume hologram to form an image of said object at an image plane.

8. The method of claim 7, wherein the step of providing said local reference source of light comprises the steps of:

redirecting a portion of said remote reference light emerging from said aberrating medium; and filtering said redirected portion of said remote reference light to provide said local reference light coherent with said remote reference light.

9. The method of claim 8, wherein the step of providing said holographic medium comprises the step of providing a photorefractive crystal.

* * * * *